Patented Nov. 22, 1949

2,489,226

UNITED STATES PATENT OFFICE 2,489,226

METHOD OF MAKING PIGMENTED POLYSTYRENE

Earl D. Morris and Stevens S. Drake, Midland, Mich., assignors to The Dow Chemical Company, Midland, Mich., a corporation of Delaware No Drawing. Application October 10, 1947, Serial No. 779,206

4 Claims. (Cl. 260—41)

This invention concerns an improved method of making pigmented polystyrene. It pertains especially to a procedure for forming a stable dispersion of a styrene-insoluble pigment in liquid monomeric styrene so that the styrene may thereafter be polymerized to obtain a uniformly pigmented polystyrene product.

It is known to dissolve dyes in monomeric styrene and thereafter polymerize the styrene, e. g. by heating to obtain a colored polystyrene product. Insofar as we are aware, no method has heretofore been known for dispersing an insoluble pigment in styrene and polymerizing the latter to obtain a uniformly colored solid product.

Insoluble pigments may be suspended in styrene by mechanically agitating a mixture of styrene and an insoluble pigment. However, when the agitation is stopped, the pigment quickly coagulates, or separates and settles to the bottom of the container. Concentrated dispersions of insoluble pigments in a vehicle similar to that employed in the paint industry when added to monomeric styrene rapidly separate to give non-uniform mixtures of the pigment and styrene. Micronizing of insoluble pigments to a fine particle size likewise is ineffectual in producing uniform dispersions of the insoluble pigments in monomeric styrene. Polymerization of a styrene and pigment mixture prepared in any of these ways results in a non-uniformly colored product.

We have discovered a method whereby insoluble pigments may be suspended in liquid styrene to form stable dispersions wherein the insoluble pigment remains uniformly distributed throughout the mass. Such pigmented styrene may then be polymerized in known manner, e. g. by heating in mass, to produce uniformly pigmented polystyrene products. The pigmented polystyrene may be ground to a molding powder or used directly for other purposes, as desired.

The invention comprises milling, e. g. on compounding rolls, a pigment together with heat-plastified polystyrene to form a color concentrate consisting of from 10 to 25 per cent of an insoluble pigment dispersed in polystyrene, forming a solution in liquid monomeric styrene of the concentrate and polystyrene in amount sufficient to produce a liquid composition having a solution viscosity of at least 35 centipoises at 25° C. and polymerizing the styrene content of the composition.

The proportions of pigment and polystyrene to be used in preparing the color concentrate are dependent upon the particular insoluble pigment employed. It is desirable to employ as high a proportion of the insoluble pigment as can be compounded together with polystyrene on the rolls at temperatures of from 170° C. to 200° C. without the mass becoming chalky. We have found that concentrates containing from 10 to 25 per cent by weight of an insoluble pigment are satisfactory for practice of this invention. In some instances, the use of more than about 15 per cent of the pigment, results in a concentrate that is too stiff to permit uniform compounding of the same. The compounding procedure should not be carried out at such high temperatures as to cause excessive decomposition of the polystyrene or injury to the insoluble pigment. As the concentration of the insoluble pigment is increased higher temperatures are required in order to maintain the mixture in a thermoplastic workable condition.

We have found that when a mixture of polystyrene and an insoluble pigment is milled on hot rolls at a plastifying temperature, e. g. of from 170° C. to 200° C., for prolonged period of time, particularly where the proportion of insoluble pigment is from 10 to 25 per cent by weight, the concentrated dispersion of pigment in polystyrene after grinding may be dissolved in monomeric styrene to form a uniform dispersion of the pigment which does not readily separate on standing. It is important that the milling operation be continued for a time sufficient to break up any agglomerates of particles of the insoluble pigment in the polystyrene. In general, we have found that a milling time of at least 20 minutes is required to produce a satisfactory pigmented concentrate and that milling times of from 30 to 60 minutes at temperatures of from 170° C. to 200° C. may be desirable depending upon the physical properties of the insoluble pigment and the amount of pigment employed.

The "color concentrate," i. e. the dispersion of pigment in solid polystyrene formed by the above milling operation, is dissolved in styrene or in a liquid solution of styrene and polystyrene, to form a liquid composition containing a desired amount of the dispersed pigment. The amount of color concentrate to be added varies depending on the proportion of pigment in the concentrate and the amount of pigment desired in the final colored polystyrene product. In most instances the color concentrate is added to the styrene, or styrene-polystyrene solution, in amount corresponding to between 0.5 and 10 per cent of the weight of the resultant liquid composition. Larger proportions of the color concentrate may in some instances be used, but maintenance of a uniform dispersion of pigment in the liquid styrene-polystyrene solution becomes increasingly difficult with increase in the concentration of the pigment.

The stability of the dispersion of pigment in the liquid composition thus formed is dependent to a large extent upon the viscosity of said composition. The viscosity is, in turn, dependent upon the concentration of polystyrene, of a given molecular weight, dissolved therein. In general, the liquid composition comprising the dispersed pigment should have a viscosity of at least 35 centipoises, and preferably of 60 centipoises or higher, at 25° C. in order to prevent coagulation or settling of the pigment during subsequent polymerization of the styrene. Viscosities of the order just stated are obtained by the presence of from about 10 to 25 per cent by weight or more of polystyrene of a usual molding quality, e. g. having a molecular weight of about 85,000 as measured by the well known Staudinger method, dissolved in the liquid composition. When the polystyrene component is of considerably lower or higher molecular weight, the proportion thereof required to give the composition the above viscosity values may be greater or smaller than just stated. In many instances the polystyrene content of the color concentrate which is dissolved in styrene is not sufficient to yield a satisfactorily stable dispersion of the pigment in the resultant liquid composition, in which case a further amount of polystyrene must be introduced from a source other than said concentrate. Such further amount of polystyrene may be supplied in any of several ways, e. g. by polymerizing to a limited extent prior to adding the color concentrate, or by adding colorless solid polystyrene before or during the operation of dissolving the color concentrate in styrene, etc.

Plasticizers such as dioctylphthalate, tricresylphosphate, dibutylphthalate, and the like, may also be added to the monomeric styrene before polymerization, if desired. When the pigmented polystyrene product is to be used as a molding powder, small amounts, from 0.5 to 2 per cent, of lubricants or mold release agents such as butyl stearate, soya bean oil, and the like may advantageously be added, together with the color concentrate, to the monomeric styrene. The resultant liquid composition may be polymerized to obtain a pigmented polystyrene product that need only be ground to a molding powder.

The liquid composition, comprising the dispersed pigment, is polymerized en masse under conditions similar to those conventionally employed in effecting the polymerization of styrene alone. The polymerization is usually accomplished by heating the composition in the substantial absence of air, e. g. in a closed container or in contact with an inert gas such as nitrogen or methane, at temperatures in the order of from 60° to 200° C. until the reaction is substantially complete. Temperatures lower or higher than the usual polymerization temperatures just mentioned may be employed if desired. The polymerization may be carried out in the presence or absence of catalysts, e. g. organic peroxides, but catalysts are usually omitted. When the polymerization is accomplished in the absence of catalysts at a temperature of about 125° C. from three to five days of heating are usually required for substantially complete reaction.

The uniformly colored polymeric product thus produced may be ground to a molding powder or may be employed directly for the production of colored polystyrene articles such as combs, etc. The colored polymeric products such as those just described usually contain from 0.05 to 2.5 per cent by weight of pigment. Larger proportions of pigment may in some instances be employed, but for most uses the amount required will fall within the preferred range just stated.

The following examples illustrate ways of practicing the invention, but are not to be construed as limiting the scope thereof:

Example 1

A concentrated dispersion of titanium dioxide in polystyrene was prepared by milling, on hot rolls for 20 minutes at a temperature of 170°–200° C., a mixture consisting of 75 parts by weight of polystyrene and 25 parts of powdered titanium dioxide. The concentrate was removed from the rolls as a sheet, cooled, and ground to a powder.

Two parts by weight of the ground concentrate and 8.5 parts by weight of polystyrene were dissolved in 89.5 parts by weight of monomeric styrene and the mixture poured into a cylindrical container. The container was placed in a heating chamber with its long axis in a vertical direction and the styrene polymerized by heating at a temperature of 75° C. for 72 hours, then raising the temperature to 200° C. and heating for an additional 48 hours to complete the polymerization. After polymerization the product was removed from the container as a single block or billet of pigmented polystyrene and cut into sections. Inspection and subsequent analysis of portions of the various sections showed the insoluble pigment to be uniformly distributed throughout the entire mass of polystyrene.

Example 2

A concentrate was prepared by milling on hot rolls for 60 minutes at a temperature of 180°–200° C., a mixture consisting of 15 parts by weight of Monastrol Fast Blue B, a copper phthalocyanine blue pigment insoluble in styrene, and 75 parts by weight of clear polystyrene. The composition was a homogeneous mixture. The concentrate was removed from the rolls as a sheet, cooled and ground to a powder.

3.33 parts by weight of the powdered concentrate, 7.17 parts by weight of clear polystyrene, 0.9 parts by weight of butylstearate, and 1.1 parts by weight of tricresylphosphate were added to 87.5 parts by weight of monomeric styrene. The mixture was stirred until the ingredients were uniformly distributed throughout the mass. The composition was sealed in a cylindrical container and placed in a heating chamber with the long axis in a vertical direction. Polymerization was effected by heating for 72 hours at 75° C. then raising the temperature to 200° C. and heating for an additional 48 hours. The product was removed from the container as a single block or billet of pigmented polystyrene and cut into sections along the long axis. The sections were separately ground to a powder and test specimens prepared by molding a portion of the powder from each section. A comparison of the molded test specimens showed the blue pigment to be uniformly distributed throughout the billet.

The above examples merely illustrate specifically ways in which the invention may be carried out. Those skilled in the art will appreciate the many variations in procedure, compositions, and the like, coming within the scope of the invention.

The proportion of insoluble pigment employed will depend upon the color effect desired. The pigments coming within the scope of this invention are those which are insoluble in monomeric styrene and which do not decompose under the conditions usually employed to effect polymerization of the monomeric styrene, i. e. temperatures up to 200° C. Among such insoluble pigments are the following: titanium dioxide, zinc sulphide, mixtures of barium sulphate and zinc sulphide Color Index No. 1259, cadmium sulphide Color Index No. 1272, copper phthalocyanine and its derivatives, carbon black, and ferric ferrocyanide.

It will be observed that these pigments are of widely varying types and do not exhibit any chemical structure by which they may be defined as a single class. They do, however, have the common property of being insoluble in monomeric styrene to produce color and they are stable at the polymerization temperatures employed. Such insoluble pigments may impart color to the polystyrene product by reason of the inherent color of the insoluble pigment and it being uniformly distributed throughout the product, but such color is not produced by solution of the pigment in the styrene monomer.

The term "insoluble pigment" as herein used means compounds that are insoluble in monomeric styrene.

Mixtures of the above-described insoluble pigments may be used to produce a wide variety of pigmented polystyrene products. However, care must be observed in the choice of the pigments to be used together, since many of the insoluble pigments have an agglomerating effect on one another when dispersed together in styrene. Such agglomeration usually occurs during the polymerization and results in an appearance of color clusters or curds in the polymerized product. The cause of this agglomeration is not known and it is not possible to predict in advance whether a particular combination of insoluble pigments will agglomerate.

In preparing uniformly pigmented polystyrene products by the method of the present invention, only a very small proportion of the final polystyrene product is subjected to degradation by compounding on hot rolls, namely, the polystyrene used in preparing the concentrate of insoluble pigment, and since but a small proportion of the concentrate is added to the liquid styrene going to make up the final pigmented polystyrene product, the effect on the properties of the end product is negligible.

Other modes of applying the principle of our invention may be employed instead of those explained, change being made as regards the methods or products herein disclosed, provided the steps or compounds stated in any of the following claims or the equivalent of such stated steps or compounds be employed.

We claim:

1. A process which comprises adding, to a liquid of the class consisting of styrene and solutions of polystyrene in styrene, polystyrene and a styrene-insoluble pigment which is stable to decomposition at temperatures up to 200° C., the pigment being incorporated together with at least a portion of the added polystyrene as a color concentrate consisting of polystyrene having from 10 to 25 per cent by weight of the pigment dispersed therein and said color concentrate being in amount corresponding to between 0.5 and 10 per cent of the weight of the entire mixture, dissolving in the styrene the polystyrene added as such and in admixture with the pigment to form a liquid composition containing polystyrene in amount sufficient to give the composition a viscosity of at least 35 centipoises at 25° C. and having the pigment uniformly dispersed therethrough, and thereafter subjecting the composition to polymerizing conditions until the styrene is polymerized to a solid.

2. A process which comprises adding, to a liquid of the class consisting of styrene and solutions of polystyrene in styrene, polystyrene and a styrene-insoluble pigment which is stable to decomposition at temperatures up to 200° C., the pigment being incorporated together with at least a portion of the added polystyrene as a color concentrate consisting of polystyrene having from 10 to 25 per cent by weight of the pigment dispersed therein and said color concentrate being in amount corresponding to between 0.5 and 10 per cent of the weight of the entire mixture, dissolving in the styrene the polystyrene added as such and in admixture with the pigment to form a liquid composition containing polystyrene in amount sufficient to give the composition a viscosity greater than 60 centipoises at 25° C. and having the pigment uniformly dispersed therethrough, and thereafter subjecting the composition to polymerizing conditions until the styrene is polymerized to a solid.

3. A process which comprises adding, to a liquid of the class consisting of styrene and solutions of polystyrene in styrene, polystyrene and a styrene-insoluble pigment which is stable to decomposition at temperatures up to 200° C., the pigment being incorporated together with at least a portion of the added polystyrene as a color concentrate consisting of polystyrene having from 10 to 25 per cent by weight of the pigment dispersed therein and said color concentrate being in amount corresponding to between 0.5 and 10 per cent of the weight of the entire mixture, dissolving in the styrene the polystyrene added as such and in admixture with the pigment to form a liquid composition containing polystyrene in amount sufficient to give the composition a viscosity of at least 35 centipoises at 25° C. and having the pigment uniformly dispersed therethrough, and thereafter heating the composition at a temperature between 60° C. and 200° C. until the styrene is polymerized to a solid.

4. A process which comprises adding, to a liquid of the class consisting of styrene and solutions of polystyrene in styrene, polystyrene and titanium dioxide, the latter being incorporated with at least a portion of the added polystyrene to form a color concentrate consisting of polystyrene having from 10 to 25 per cent by weight of titanium dioxide dispersed therein and said color concentrate being in amount corresponding to between 0.5 and 10 per cent of the weight of the entire mixture, dissolving in the styrene the polystyrene added as such and in admixture with the titanium dioxide to form a liquid composition containing polystyrene in amount sufficient to give the composition a viscosity of at least 35 centipoises at 25° C. and having the titanium dioxide uniformly dispersed therethrough, and thereafter subjecting the composition to polymerizing conditions until the styrene is polymerized to a solid.

EARL D. MORRIS.
STEVENS S. DRAKE.

REFERENCES CITED

The following references are of record in the file of this patent:

UNITED STATES PATENTS

| Number | Name | Date |
|---|---|---|
| 2,067,234 | Gordon et al. | Jan 12, 1937 |